O. F. ZAHN.
ROLLER BEARING.
APPLICATION FILED AUG. 27, 1906.
981,049.
Patented Jan. 10, 1911.
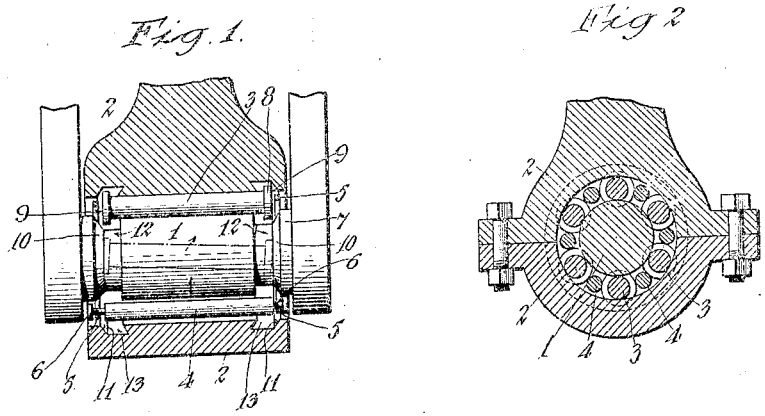

UNITED STATES PATENT OFFICE.

OSWALD F. ZAHN, OF LOS ANGELES, CALIFORNIA, ASSIGNOR TO ZAHN SELF RIGHTING ROLLER BEARING COMPANY, OF LOS ANGELES, CALIFORNIA, A CORPORATION OF CALIFORNIA.

ROLLER-BEARING.

981,049.
Specification of Letters Patent. Patented Jan. 10, 1911.
Application filed August 27, 1906. Serial No. 332,294.

*To all whom it may concern:*

Be it known that I, OSWALD F. ZAHN, a citizen of the United States, residing at Los Angeles, in the county of Los Angeles, State of California, have invented a new and useful Improvement in Roller-Bearings, of which the following is a specification.

The main object of the invention is to provide a roller bearing adapted for heavy loads.

Another object of this invention is to provide a roller bearing wherein the bearing members are retained in position, as regards both transverse and longitudinal movement, by the agency of a single set of bearing rollers, and wherein the end thrust as well as the top, bottom or side pressure is taken by the same rollers, thereby dispensing with the use of supplementary devices whose sole function is to take the end thrust.

A further object of the invention is to provide a roller bearing with means which, when a roller skews in the bearing, will bring into action forces tending to right the roller in the bearing.

According to my invention, the bearing is constructed in such manner that the friction brought into action, on deflection of the rollers, will produce a forward drag at the lagging end of the roller, to rectify the rollers in the bearing.

In the accompanying drawings:—Figure 1 is a longitudinal section of a crank pin bearing showing an embodiment of the invention. Fig. 2 is a transverse section of the same.

Referring to Fig. 1, the bearing comprises an inner bearing member 1, an outer bearing member 2, bearing rollers 3 rolling between said inner and outer members, and spacing rollers 4 between the bearing rollers. The inner member 1 is here shown as a crank pin and the outer member 2 as the wrist or head therefor, but the construction is capable of other applications. The spacing rollers are smaller in diameter than the bearing rollers and are guided so as not to rub against either of the bearing members 1, 2 by means of retaining rings 5, surrounding said rollers and running in necks 6 therein, beyond the ends of rollers 3, and by means of annular tracks 7 on the inner bearing member, on which said rollers 4 roll.

The bearing rollers 3 are provided with means for engaging the inner and outer bearing members to hold the parts against relative longitudinal displacement. For this purpose the rollers have annular enlargements or flanges 8 at or near their ends, the outer faces of said flanges forming shoulders 9 to engage annular abutments 10 on the inner bearing member and annular abutments 11 on the outer bearing member. To form these annular abutments the inner bearing member has a groove 12 near each end, whose outer wall, namely, the wall farthest from mid-length of the bearing, forms the abutment 10, and the outer bearing member has a groove 13 near each end whose outer wall forms abutment 11. The annular abutment 10 at each end of the inner member is inclined or beveled outwardly and the annular abutment 11 at each end of the outer member is inclined in reverse manner, so that the contact is only at the outer edges or parts of the roller flanges of greater diameter than the bearing portion of the rollers. It is essential that the abutment 10 has a diameter not exceeding the diameter of the bearing surface of inner bearing member and so it is preferably made slightly smaller so that rectification is assured. It is also desirable that the smallest diameter of the abutment 11 on the outer bearing member be not less than the bearing surface of the outer bearing member, and so it is desirable to construct the same of a slightly larger diameter. In normal operation these flanges just touch or just clear the abutments, and the parts are thereby held against relative endwise displacement. It is necessary that the inner faces of the flanges should be free from engagement with the bearing members so as not to interfere with the relative longitudinal movement of the rollers required to effect rectification, as hereinafter described.

It is assumed that the inner bearing member 1 is turning in direction of the full arrow, the rollers revolving in the same direction, but rotating oppositely. If the roller skews, as shown in dotted lines, with the right hand end lagging it will drift endwise in the outer bearing member, toward the right, as shown by dotted arrow, and bring the shoulder at that end into close engagement with the outer abutment. This engagement will take place at a part of the roller that is of larger diameter and therefore of greater peripheral speed than the main bearing portion of the roller, and the friction at this point of contact will therefore tend to pull this lagging end of the roller forward to rectify the roller in the bearing. At the same time the inner bearing member tends to drift also toward the right, but in advance of the roller, so that the annular abutment 10 thereon is brought into engagement with the shoulder 9 at the left hand end of the roller at a point of greater diameter than the main bearing portion of the roller, and the rubbing friction thereby developed will tend to retard this leading end of the roller, so that there is a rectifying tendency at each end of the roller. With respect to the inner bearing member the roller is rolling backward, and the left hand end of the roller is the lagging end if skewed as stated. The relative drift of the roller and bearing member will bring the flange at the left hand end of the roller against the annular abutment 10 at that end, and on account of the larger diameter thus brought into operation, will tend to make this end of the roller roll backward faster on the inner member, to rectify the roller. The enlargement or flanges 8 of the rollers 3 take up the end thrust by engaging directly with the annular abutments 11 of the outer bearing member at one end of the bearing and the annular abutments 10 of the inner bearing member at the other end of the bearing according to the direction of end thrust.

It is essential that the bearing rollers and bearing members should be provided with means preventing engagement of the faces other than those above described as engaging to rectify the rollers. Such means are constituted in the present case by the flanges and the abutments, but my invention is not necessarily limited thereto. This effect is secured by recessing the bearing members at the inner side of the abutments, so as to be out of contact with the inner walls of the flanges, the width of the grooves or recesses being such that the total clearance or play between the inside walls of the grooves and flanges is greater than the total clearance between the outside walls of the grooves and flanges.

The inner and outer bearing members and the bearing and spacing rollers are preferably coated with metal of different character from the body thereof and especially with a metal which is less oxidizable than such body portion. For example, the body of such parts may be of steel and the coating of copper giving a softer surface that will be compacted by the rolling to fill inequalities or of nickel which will present a harder surface. Some of these members may furthermore be coated with one metal, for example, copper and others with a different metal, for example, nickel.

What I claim is:—

1. A roller bearing having inner and outer bearing members, the outer bearing member having abutments and rollers each having a bearing portion engaging both bearing members, said rollers each provided with an enlarged flange near an end, the outer face of said flange engaging abutments of said bearing members, and the other face of the flange being free from engagement with the bearing members, and the smallest diameter of the engaged abutment being as large as the diameter of the bearing surface of the outer bearing member.

2. A roller bearing having inner and outer bearing members, one of which has abutments, bearing rollers having a bearing portion engaging with said bearing members and provided with a flange near an end of larger diameter than the bearing surface of said roller, the outwardly-facing side of said flange engaging with one of said abutments, and said bearing members being recessed so as to be clear of the other side of the flange.

3. A roller bearing having inner and outer bearing members with recesses, and rollers having a bearing portion engaging with both bearing members and provided with an enlarged flange near an end adapted to engage with those walls of said recesses which face the mid-length of the rollers, the other walls of recesses being free from engagement with said flanges.

4. A roller bearing having inner and outer bearing members, one of which has an abutment, bearing rollers having a bearing portion engaging with both the inner and outer bearing members, said rollers provided each with a flange near an end of larger diameter than the bearing surface of the roller, the outwardly facing side of the flange engaging with said abutment on a bearing member, and the other side of the flange being free from engagement with either bearing member.

5. A roller bearing having inner and outer bearing members, the inner bearing member having an abutment, a bearing roller having a bearing portion engaging with both the inner and outer bearing members, said bearing roller having an enlarged flange near an end, the side of the flange farthest from mid length of said roller being free to engage with said abutment on the inner bearing member, the diameter of the bearing surface of the inner bearing member being as large as the diameter of said abutment, and the other side of roller flange being free from engagement with either bearing member.

6. A roller bearing having inner and outer bearing members, the outer bearing member having an abutment, a bearing roller having a bearing portion engaging with both the inner and outer bearing members, said bearing roller having an enlarged flange near an end, the side of the flange farthest from mid length of said roller being free to engage with said abutment on the outer bearing member, the diameter of the bearing surface of the outer bearing member being as large as the diameter of said abutment, and the other side of the roller flange being free from engagement with either bearing member.

7. In a roller bearing, inner and outer bearing members having recesses, and bearing rollers having a bearing portion engaging with both the inner and outer bearing members and provided with a flange near an end of larger diameter than the bearing surface of rollers, said flange being free to engage with the walls of the recesses in both bearing members that face the mid-length of roller, the other walls of the recesses being free from engagement with the flange.

8. A roller bearing having inner and outer bearing members with recesses, and bearing rollers having a flange near each end extending beyond the diameter of the bearing surface of said rollers and entering in said recesses, the bearing members being recessed so that the sides of the roller flanges and recesses nearest mid-length of rollers are free from engagement with each other.

9. A roller bearing comprising inner and outer bearing members with cylindrical bearing surfaces, each of said members having an annular groove near each end and bearing rollers between said members and engaging said cylindrical surfaces, each roller having flanges extending within the grooves in the inner and outer bearing members, the total clearance between the inside walls of the grooves and flanges being greater than the total clearance between the outside walls of the grooves and flanges, so that engagement will take place between said outside walls, the inside walls thereof being free from engagement with the bearing members.

10. A roller bearing comprising an inner and outer bearing member with cylindrical bearing surfaces, the outer bearing member having an abutment near each end, of greater diameter throughout than the diameter of the bearing surface of said member, and the inner bearing member having an abutment near each end, of less diameter throughout than the diameter of the bearing surface of said member, bearing rollers between said bearing members and engaging the cylindrical bearing surfaces thereof, and provided with flanges engaging the said abutments, the bearing members being recessed at the inner side of said abutments to be out of contact with the inner walls of the flanges.

In testimony whereof, I have hereunto set my hand at Los Angeles, California, this 17th day of August, 1906.

OSWALD F. ZAHN.

In presence of—
ARTHUR P. KNIGHT,
FRANK L. A. GRAHAM.